United States Patent
Aoki et al.

(10) Patent No.: US 9,308,934 B2
(45) Date of Patent: Apr. 12, 2016

(54) STEERING CONTROL SYSTEM FOR VEHICLE AND STEERING CONTROL METHOD FOR VEHICLE

(71) Applicants: Kenichiro Aoki, Miyoshi (JP); Satoru Mikamo, Okazaki (JP); Naoki Yamano, Okazaki (JP)

(72) Inventors: Kenichiro Aoki, Miyoshi (JP); Satoru Mikamo, Okazaki (JP); Naoki Yamano, Okazaki (JP)

(73) Assignees: TOYOTA JIDOSHA KABUSHIKI KAISHA, Toyota-shi (JP); JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/439,817

(22) PCT Filed: Jan. 21, 2014

(86) PCT No.: PCT/IB2014/000051
§ 371 (c)(1),
(2) Date: Apr. 30, 2015

(87) PCT Pub. No.: WO2014/115014
PCT Pub. Date: Jul. 31, 2014

(65) Prior Publication Data
US 2015/0298726 A1 Oct. 22, 2015

(30) Foreign Application Priority Data
Jan. 24, 2013 (JP) ................. 2013-010764

(51) Int. Cl.
 *B62D 5/04* (2006.01)
 *B62D 6/10* (2006.01)
(52) U.S. Cl.
 CPC .............. *B62D 5/0463* (2013.01); *B62D 5/049* (2013.01); *B62D 5/0472* (2013.01); *B62D 5/0484* (2013.01); *B62D 6/10* (2013.01)
(58) Field of Classification Search
 CPC ...... B62D 5/0463; B62D 6/10; B62D 5/0484; B62D 5/0472

USPC .......................................................... 701/43
See application file for complete search history.

(56) References Cited

U.S. PATENT DOCUMENTS

2014/0336878 A1* 11/2014 Yanai ................... G01D 5/145
701/41

(Continued)

FOREIGN PATENT DOCUMENTS

JP         4969368         7/2012

OTHER PUBLICATIONS

International Search Report Issued Apr. 28, 2014 in PCT/IB14/000051 filed Jan. 21, 2014.

*Primary Examiner* — Richard Camby
(74) *Attorney, Agent, or Firm* — Oblon, McClelland, Maier & Neustadt, L.L.P.

(57) ABSTRACT

A steering control system for a vehicle includes an electric motor, a torque sensor, an angular velocity sensor, and a control unit. The electric motor applies assist force to a turning operation of a steering wheel. The torque sensor detects a torque generated in a steering system including the steering wheel and varying with the turning operation. The angular velocity sensor detects an angular velocity generated in the steering system and varying with the turning operation. The control unit computes an assist control amount for the turning operation by using the torque and the angular velocity, and, when an abnormality occurs in a torque detection operation, increases a control amount computed by using the angular velocity among control amounts that constitute the assist control amount as compared to that when torque sensor operation is normal and executes drive control over the electric motor based on the assist control amount.

13 Claims, 8 Drawing Sheets

(56) References Cited

U.S. PATENT DOCUMENTS

2014/0343794 A1* 11/2014 Tamaizumi .......... B62D 5/0472 701/42

2015/0066306 A1* 3/2015 Kodera ................ B62D 5/0466 701/43

2015/0203148 A1* 7/2015 Kuramitsu ........... B62D 5/0481 701/41

* cited by examiner

STEERING CONTROL SYSTEM FOR VEHICLE AND STEERING CONTROL METHOD FOR VEHICLE

BACKGROUND OF THE INVENTION

1. Field of the Invention

The invention relates to a steering control system for a vehicle and a steering control method for a vehicle.

2. Description of Related Art

For example, there is known a control method for an electric power steering system as described in Japanese Patent No. 4969368. In this existing control method for an electric power steering system, a steering assist amount is controlled in response to a steering torque detected by a steering torque sensor and a derivative value of the steering torque. In the control method, at the time when the steering torque sensor is abnormal, the steering torque is estimated on the basis of information about a state of a vehicle, acquired via an in-vehicle network of which the sensing interval is longer than the sensing interval of the steering torque sensor, and the estimated steering torque is used instead of the steering torque. Thus, the steering assist amount is controlled on the basis of the estimated steering torque and a derivative value of the estimated steering torque. In the existing control method for an electric power steering system, in controlling the steering assist amount at the time when the steering torque sensor is abnormal, a control gain based on the derivative value of the estimated steering torque is set so as to be larger than a control gain based on the derivative value of the steering torque at the time when the steering torque is normal.

With the above control method for an electric power steering system, at the time when the steering torque sensor is abnormal, it is possible to control the steering assist amount on the basis of the estimated steering torque, estimated on the basis of the information about the state of the vehicle, and the derivative value of the estimated steering torque. Furthermore, in the above control over the steering assist amount, although the sensing interval at which information about the state of the vehicle is acquired via the in-vehicle network is longer than the sensing interval of the steering torque sensor, it is possible to suppress a decrease in the response of steering assistance at the time when the steering torque sensor is abnormal by setting the control gain based on the derivative value of the estimated steering torque such that the control gain based on the derivative value of the estimated steering torque is larger than the control gain based on the derivative value of the steering torque at the time when the steering torque sensor is normal. Thus, a steering feeling close to that during normal times is obtained.

Incidentally, in the above-described existing control method for an electric power steering system, the sensing interval at which information about the state of the vehicle is acquired via the in-vehicle network is longer than the sensing interval of the steering torque sensor, so an update cycle of the estimated steering torque shortens. Therefore, for example, if torque vibrations due to external force are input to the electric power steering system because of a road noise, or the like, aliasing may occur. That is, in the above-described existing control method for an electric power steering system, if a torque detection cycle becomes longer than half the torque vibration cycle, that is, Nyquist's sampling theorem is violated, aliasing occurs. If the estimated steering torque is estimated in a state where aliasing has been occurring, a desired assist amount (assist torque) may not be obtained.

Figure 12A:
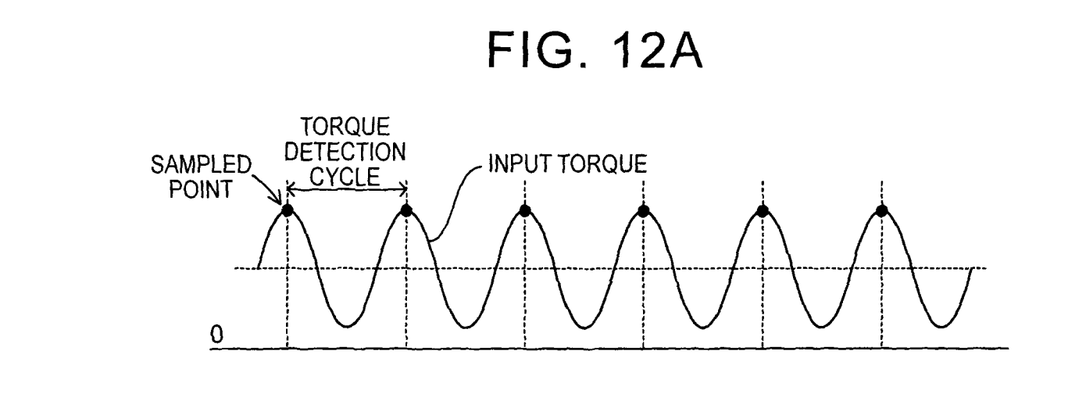
FIG. 12A and FIG. 12B are views for illustrating the influence of aliasing.

This will be more specifically described with reference to FIG. 12A and FIG. 12B. FIG. 12A shows a case in which, for example, when the waveform of input torque (estimated steering torque) that is input to the existing electric power steering system periodically varies sinusoidally, a torque (estimated steering torque) that is detected at each sampled point at intervals of the torque detection cycle is detected as a constant value larger than an average value indicated by the dashed line due to the influence of aliasing. In this case, the torque (estimated steering torque) detected as a constant value is larger than the average value, so the assist amount may increase and the differential value obtained from the thus detected torque (estimated steering torque) is "0". Therefore, it is difficult to maintain the response of steering assistance even when a control gain based on the derivative value is increased.

Figure 12B:
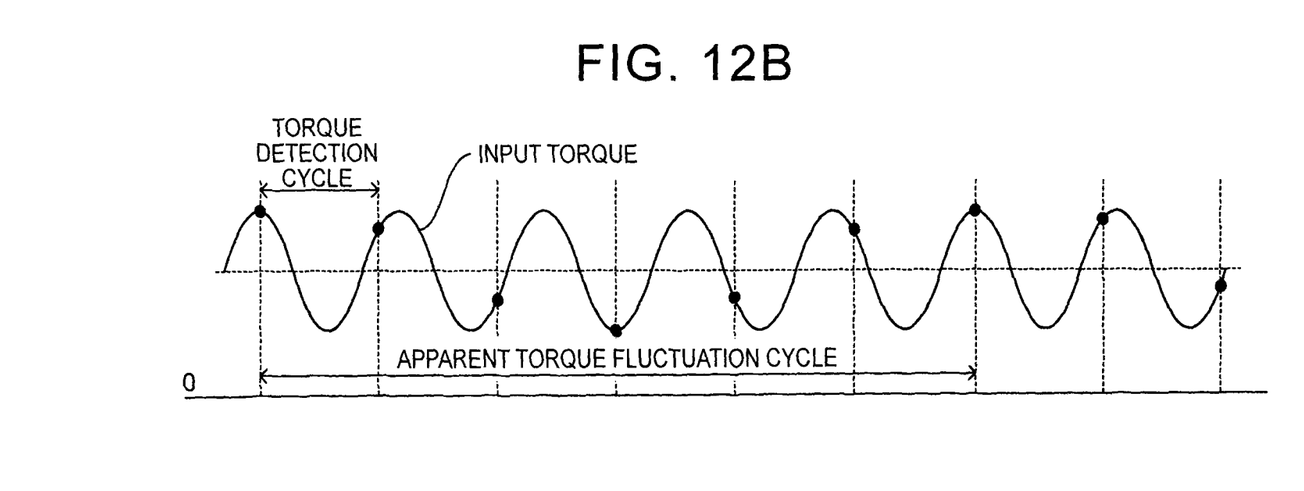

FIG. 12B shows a case in which, for example, when the waveform of input torque (estimated steering torque) that is input to the existing electric power steering system periodically varies sinusoidally, a torque (estimated steering torque) that is detected at each sampled point at intervals of the torque detection cycle is detected so as to fluctuate in accordance with an apparent torque fluctuation cycle due to the influence of aliasing although the average value indicated by the dashed line is constant. In this case, the detected torque (estimated steering torque) apparently fluctuates at a cycle different from the periodical variation (oscillation) of the input torque for the constant average value. Therefore, the assist amount may fluctuate unintentionally, and the derivative value also unintentionally fluctuates, so it is difficult to maintain the response of steering assistance.

In this way, if the torque (estimated steering torque) or the derivative value of the torque, both of which can be influenced by aliasing, is used, it may be difficult to appropriately use, particularly, the derivative value of the torque (estimated steering torque) in steering assistance control. As a result, vibrations (self-excited vibrations) due to the input torque easily occur in a turning operation direction of a steering wheel. Thus, when there occurs an abnormality in the steering torque sensor, a driver may perceive unpleasant self-excited vibrations due to a disturbance, such as a road noise, via the steering wheel gripped by the driver itself, and may experience discomfort.

SUMMARY OF THE INVENTION

The invention provides a steering control system for a vehicle and a steering control method for a vehicle, which are able to stably assist driver's operation of a steering wheel even when there occurs an abnormality in detecting a torque with the use of a torque sensor.

An aspect of the invention provides a steering control system for a vehicle. The steering control system includes: an electric motor configured to apply assist force to turning operation of a steering wheel; a torque sensor configured to detect a torque that is generated in a steering system including the steering wheel and that varies with turning operation of the steering wheel; an angular velocity sensor configured to detect an angular velocity that is generated in the steering system including the steering wheel and that varies with turning operation of the steering wheel; and a control unit configured to compute an assist control amount for turning operation of the steering wheel by using the torque and the angular velocity, and configured to, when there occurs an abnormality in operation of the torque sensor to detect the torque, increase a first control amount that is computed by using the angular velocity detected by the angular velocity sensor among control amounts that constitute the assist control amount as compared to that when operation of the torque sensor to detect the torque is normal and execute drive control over the electric motor on the basis of the assist control amount.

In the above aspect, the first control amount that is computed by using the angular velocity detected by the angular velocity sensor may be a damping control amount for suppressing vibrations occurred in proportion to the angular velocity in a turning operation direction of the steering wheel. In these cases, the control unit may include: an abnormality determination unit configured to determine whether there is an abnormality in operation of the torque sensor to detect the torque; and an angular velocity-related control amount computing unit configured to, when the abnormality determination unit has determined that there is an abnormality, compute the first control amount that is computed by using the angular velocity detected by the angular velocity sensor among the control amounts that constitute the assist control amount by increasing the first control amount as compared to that when operation of the torque sensor to detect the torque is normal.

With these configurations, when there occurs an abnormality in detection operation of the torque sensor, the control unit is able to compute the first control amount that is computed by using the angular velocity detected by the angular velocity sensor (specifically, a damping control amount) among the control amounts that constitute the assist control amount by increasing the first control amount. Thus, for example even when there occur self-excited vibrations in the turning operation direction of the steering wheel due to a disturbance, or the like, input to the steering system, it is possible to quickly damp and converge the occurred self-excited vibrations by using the control amount that is computed by using the angular velocity detected by the angular velocity sensor (specifically, the damping control amount). Thus, even if there occurs an abnormality in the detection operation of the torque sensor, it is possible to execute assist control close to that during normal times, it is possible to provide stable assistance, so it is possible to effectively suppress a feeling of strangeness experienced by the driver.

When there occurs an abnormality in the detection operation of the torque sensor, it is possible to increase the first control amount that is computed by using the angular velocity detected by the angular velocity sensor (specifically, the damping control amount), so, for example, even if there occurs an abnormality in the detection operation of the torque sensor and the detected torque is influenced by aliasing as a result of detection, it is possible to suppress unintended self-excited vibrations of the steering wheel. Thus, it is possible to effectively prevent occurrence of unintended unpleasant assistance in driver's turning operation of the steering wheel due to the influence of aliasing.

In the above aspect, the control unit may be configured to, when there occurs an abnormality in operation of the torque sensor to detect the torque, reduce a first control amount that is computed by using a derivative value obtained by temporally differentiating the torque detected by the torque sensor among the control amounts that constitute the assist control amount as compared to that when operation of the torque sensor to detect the torque is normal.

In the above aspect, the second control amount that is computed by using the derivative value obtained by temporally differentiating the torque detected by the torque sensor may be a derivative control amount that converges vibrations that occur in the steering wheel in proportion to the derivative value due to a disturbance that is input from an outside to the steering system.

With these configurations, when there is an abnormality in the detection operation of the torque sensor, the control unit is able to reduce the second control amount that is computed by using the derivative value obtained by temporally differentiating the torque detected by the torque sensor (specifically, the derivative control amount). Thus, it is possible to effectively reduce occurrence of a situation that there is an abnormality in the detection operation of the torque sensor and the second control amount that is computed by using the derivative value obtained by temporally differentiating the torque detected by the torque sensor (specifically, the derivative control amount) is, for example, computed so as to be larger than or smaller than an intended amount in assist control due to the influence of aliasing, so it is possible to provide stable assistance.

In this case, the second control amount that is computed by using the derivative value obtained by temporally differentiating the torque (specifically, the derivative control amount) reduces, and vibrations easily occur in the turning operation direction of the steering wheel due to a disturbance. However, in this case as well, it is possible to increase the first control amount that is computed by using the angular velocity detected by the angular velocity sensor (specifically, the damping control amount). Thus, even if there occurs an abnormality in the detection operation of the torque sensor and the detected torque is influenced by aliasing, it is possible to suppress unintended self-excited vibrations of the steering wheel. Thus, it is possible to effectively prevent occurrence of unintended unpleasant assistance in driver's turning operation of the steering wheel.

In the above aspect, the control unit may be configured to, when there occurs an abnormality in operation of the torque sensor to detect the torque, set a dead zone in which the assist control amount is computed such that a third control amount that is computed by using the torque detected by the torque sensor among the control amounts that constitute the assist control amount is set to "0" by assuming the magnitude of the torque that is input as a result of turning operation of the steering wheel as "0".

In the above aspect, the control unit may be configured to, when there occurs an abnormality in operation of the torque sensor to detect the torque, expand a range in which the magnitude of the torque that is input as a result of turning operation of the steering wheel is assumed as "0" in the dead zone.

In the above aspect, the third control amount that is computed by using the torque may be a basic control amount that correlates with the torque so as to monotonously increase and that determines an assist characteristic for turning operation of the steering wheel.

With these configurations, when there is an abnormality in the detection operation of the torque sensor, the control unit is able to set the dead zone near the neutral position of the steering wheel for the third control amount that is computed by using the torque detected by the torque sensor (specifically, the basic control amount). Thus, in the case where there is an abnormality in the detection operation of the torque sensor, for example, when the driver causes the vehicle to travel straight ahead (in other words, when the torque that is input by the driver to conduct turning operation is "0"), it is possible to effectively prevent fluctuations of the third control amount that is computed by using the torque detected by the torque sensor (specifically, the basic control amount) due to the influence of aliasing.

In this case as well, it is possible to increase the first control amount that is computed by using the angular velocity detected by the angular velocity sensor (specifically, the damping control amount) or reduce the second control amount that is computed by using the derivative value obtained by temporally differentiating the torque detected by the torque sensor (specifically, the derivative control amount). Thus, even if there occurs an abnormality in the detection operation of the torque sensor and the detected torque is influenced by aliasing, it is possible to suppress unintended self-excited vibrations of the steering wheel. Thus, it is possible to effectively prevent occurrence of unintended unpleasant assistance in driver's turning operation of the steering wheel.

In the above aspect, the control unit may be configured to, when there occurs an abnormality in operation of the torque sensor to detect the torque, reduce a maximum gradient of a third control amount that is computed by using the torque for a variation in the torque among the control amounts that constitute the assist control amount as compared to that when operation of the torque sensor to detect the torque is normal.

With this configuration, when there is an abnormality in the detection operation of the torque sensor, the control unit is able to reduce the maximum gradient of the third control amount, which is computed by using the torque detected by the torque sensor, for a variation in the torque. Thus, even when there is an abnormality in the detection operation of the torque sensor, it is possible to stably assist driver's turning operation of the steering wheel. In this case as well, it is possible to increase the first control amount that is computed by using the angular velocity detected by the angular velocity sensor (specifically, the damping control amount) or reduce the second control amount that is computed by using the derivative value obtained by temporally differentiating the torque detected by the torque sensor (specifically, the derivative control amount). Thus, even if there occurs an abnormality in the detection operation of the torque sensor and the detected torque is influenced by aliasing, it is possible to suppress unintended self-excited vibrations of the steering wheel. Thus, it is possible to effectively prevent occurrence of unintended unpleasant assistance in driver's turning operation of the steering wheel.

In the above aspect, the first control amount that is computed by using the torque may be a basic control amount that correlates with the torque so as to monotonously increase and that determines an assist characteristic for turning operation of the steering wheel.

In the above aspect, the control unit may be configured to, when there occurs an abnormality in operation of the torque sensor to detect the torque, compute the assist control amount by keeping the torque, detected by the torque sensor up to the last detection cycle, until the torque sensor detects the torque in the next detection cycle.

In the above aspect, the control unit may be configured to, when the torque sensor detects the torque multiple times within each detection cycle, compute the assist, control amount by keeping the torque detected last time among the plurality of torques detected within the detection cycle until the torque sensor detects the torque in the next detection cycle.

In the above aspect, the control unit may be further configured to, when there occurs an abnormality in operation of the torque sensor to detect the torque, compute the assist control amount by keeping a derivative value obtained by temporally differentiating the torque, detected by the torque sensor up to the last detection cycle, until the torque sensor detects the torque in the next detection cycle.

A second aspect of the invention provides a steering control method for a vehicle. The steering control method includes: detecting a torque that is generated as a result of turning operation of a steering wheel in a steering system of the vehicle of which a wheel is turned, with the use of a torque sensor; detecting an angular velocity that is generated as a result of turning operation of the steering wheel in the steering system of the vehicle, with the use of an angular velocity sensor; determining whether there is an abnormality in operation of the torque sensor to detect the torque; computing an assist control amount for turning operation of the steering wheel by using the torque and the angular velocity when there is no abnormality in operation of the torque sensor to detect the torque; when there is an abnormality in operation of the torque sensor to detect the torque, computing a control amount that is computed by using the angular velocity among control amounts that constitute, the assist control amount by increasing the control amount as compared to that when there is no abnormality in operation of the torque sensor to detect the torque; and controlling an electric motor that applies assist force to turning operation of the steering wheel on the basis of the assist control amount.

With these configurations, when there occurs an abnormality in the detection operation of the torque sensor, the detection cycle of the torque sensor is extended so as to be longer than the control operation cycle of the control unit. In this case, the control unit is able to keep the torque detected in the last detection cycle and the derivative value obtained by temporally differentiating the torque until the next detection cycle. Thus, it is possible to compute the assist control amount by using the kept torque and derivative value, so, even when there occurs an abnormality in the detection operation of the torque sensor, it is possible to execute stable assist control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
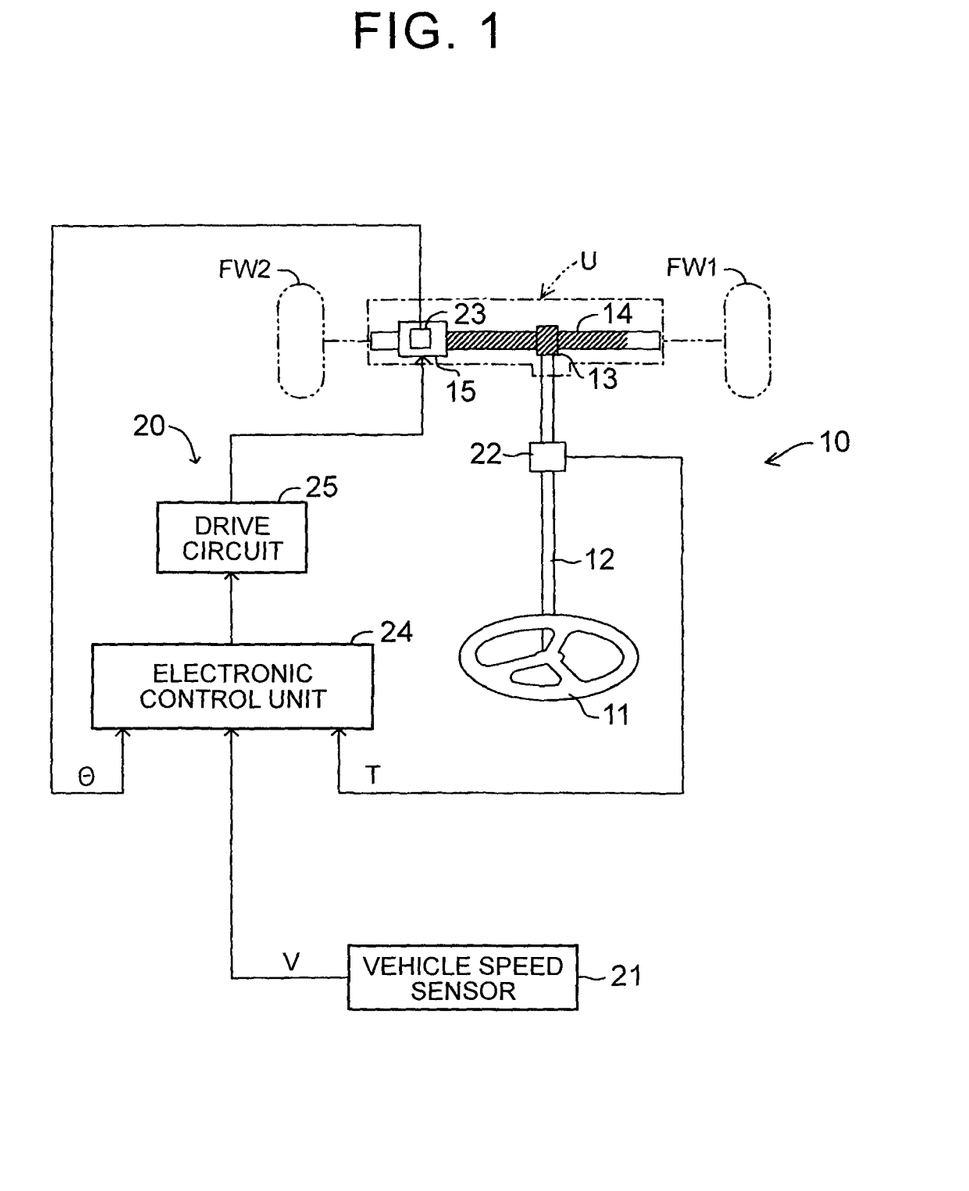
FIG. 1 is a schematic view that shows the configuration of, an electric power steering system to which the steering control system according to the invention is applied.

Hereinafter, a steering control system for a vehicle according to an embodiment of the invention will be described with reference to the accompanying drawings. FIG. 1 schematically shows an electric power steering system 10 to which the steering control system for a vehicle according to the present embodiment is applicable.

The electric power steering system 10 includes a steering wheel 11 that is turned by a driver in order to turn right and left front wheels FW1, FW2 that serve as steered wheels. The steering wheel 11 is fixed to the upper end of a steering shaft 12. The lower end of the steering shaft 12 is connected to a turning gear unit U. A system including the steering wheel 11, the steering shaft 12 and the turning gear unit U is referred to as steering system.

The turning gear unit U is, for example, a gear unit that employs a rack-and-pinion type. The turning gear unit U is configured such that rotation of a pinion gear 13 integrally assembled to the lower end of the steering shaft 12 is transmitted to a rack bar 14. An electric motor 15 (hereinafter, the electric motor is referred to as EPS motor 15) for reducing (assisting) operation force (more specifically, steering torque) that is input to the steering wheel 11 by the driver is provided in the turning gear unit U. Assist force (more specifically, assist torque) that is generated by the EPS motor 15 is transmitted to the rack bar 14.

With this configuration, the rotation force of the steering shaft 12 as a result of the driver's turning operation of the steering wheel 11 is transmitted to the rack bar 14 via the pinion gear 13, and the assist torque of the EPS motor 15 is transmitted to the rack bar 14. Thus, the rack bar 14 is displaced in the axial direction by the rotation force from the pinion gear 13 and the assist torque of the EPS motor 15. Thus, the right and left front wheels FW1, FW2 respectively connected to both ends of the rack bar 14 are turned laterally.

The electric power steering system 10 in the present embodiment is implemented as a rack assist type in which the EPS motor 15 transmits assist torque to the rack bar 14 of the turning gear unit U. However, a pinion assist type in which the EPS motor 15 transmits assist torque to the pinion gear 13 or a column assist type in which the EPS motor 15 transmits assist torque to a column main shaft, which constitutes the steering shaft 12, via a predetermined speed reduction mechanism may be employed as another configuration of the electric power steering system 10.

Next, an electric control device 20 that controls the operation of the above-described EPS motor 15 will be described. The electric control device 20 includes a vehicle speed sensor 21, a steering torque sensor 22 and a motor rotation angle sensor 23. The steering torque sensor 22 constitutes a torque sensor. The motor rotation angle sensor 23 constitutes an angular velocity sensor. The vehicle speed sensor 21 detects a vehicle speed V of the vehicle, and outputs a signal corresponding to the vehicle speed V.

The steering torque sensor 22 is assembled to the steering shaft 12. The steering torque sensor 22 detects a steering torque T at a predetermined detection cycle, and outputs a signal corresponding to the steering torque T. The steering torque T is input to the steering shaft 12 by driver's turning operation of the steering wheel 11. The steering torque sensor 22 outputs the steering torque T as a positive value when the steering wheel 11 is turned rightward. The steering torque sensor 22 outputs the steering torque T as a negative value when the steering wheel 11 is turned leftward.

Here, the steering torque sensor 22 in the present embodiment is formed of a sensor that varies an electric resistance or a magnetic resistance in response to a twisted angle of a torsion bar provided in the middle of the steering shaft 12 and then outputs a voltage signal corresponding to the varied electric resistance or magnetic resistance. Therefore, in the present embodiment, two sets resolver sensors are employed and implemented as the steering torque sensor 22. The resolver sensors include a resolver rotor that rotates together with the torsion bar and a resolver stator fixed to a vehicle body side in face of the resolver rotor. A primary coil that is an exciting coil is provided at one of the resolver rotor and the resolver stator, and a pair of secondary coils that serve as detection coils are provided at the other one of the resolver rotor and the resolver stator at a phase interval of $\pi/2$. By exciting the primary coil with a SIN-phase signal, the secondary coils respectively output a SIN-phase output signal and a COS-phase output signal as two types of induced voltage signals corresponding to a rotation angle.

The steering torque sensor 22 formed of the two sets resolver sensors detects a rotation angular position at a predetermined detection cycle by obtaining the amplitude ratio between these SIN-phase output signal and the COS-phase output signal, and outputs a signal corresponding to the rotation angular position as a signal corresponding to the steering torque T. The steering torque sensor 22 outputs a signal at the detection cycle shorter than or equal to the operation control cycle of the EPS motor 15 controlled by the electric control device 20 when the detection operation of the steering torque sensor 22 is normal on the basis of a known abnormality determination method, or the like. In other words, the steering torque sensor 22 outputs a signal corresponding to the steering torque T at the detection cycle equal to or shorter than the control operation cycle of assist control. On the other hand, when there occurs an abnormality in the operation of the steering torque sensor 22, the steering torque sensor 22 outputs a signal corresponding to the steering torque T at the detection cycle longer than the control operation cycle.

The motor rotation angle sensor 23 is assembled to the EPS motor 15. The motor rotation angle sensor 23 detects a rotation angle Θ with respect to a preset rotation position, and outputs a signal corresponding to the rotation angle Θ. The motor rotation angle sensor 23 outputs the rotation angle Θ as a positive value when the EPS motor 15 applies assist torque to the rack bar 14 in order to turn the right and left front wheels FW1, FW2 rightward. The motor rotation angle sensor 23 outputs the rotation angle Θ as a negative value when the EPS motor 15 applies assist torque to the rack bar 14 in order to turn the right and left front wheels FW1, FW2 leftward.

The electric control device 20 includes an electronic control unit 24 that controls the operation of the EPS motor 15. The electronic control unit 24 includes a microcomputer formed of a CPU, a ROM, a RAM, and the like, as a major component, and controls the operation of the EPS motor 15. Therefore, the sensors 21 to 23 are connected to an input side of the electronic control unit 24. The electronic control unit 24 executes drive control over the EPS motor 15 by using the detected values detected by these sensors 21 to 23 as will be described later. On the other hand, a drive circuit 25 for driving the EPS motor 15 is connected to an output side of the electronic control unit 24.

Next, drive control over the EPS motor 15, that is, assist control, executed by the thus configured electric control device 20 (more specifically, the electronic control unit 24) will be described with reference to the functional block diagram of FIG. 2 that shows functions implemented through computer program processing in the electronic control unit 24. The electronic control unit 24 applies appropriate assist force by executing drive control over the EPS motor 15 in order to reduce the load of driver's turning operation of the steering wheel 11.

Therefore, the electronic control unit 24 is formed of a torque-related control amount computing unit 30, a rotation angle-related control amount computing unit 40 and an assist control unit 50. The torque-related control amount computing unit 30 computes a basic control amount Ta and a derivative control amount Tb that are control amounts relating to the steering torque T (hereinafter, the steering torque T is also referred to as torque T) that is detected by the steering torque sensor 22. The rotation angle-related control amount computing unit 40 computes a damping control amount Tc that is a control amount relating to the rotation angle Θ that is detected by the motor rotation angle sensor 23. The assist control unit 50 computes an assist amount Tt as an assist control amount and executes drive control over the EPS motor 15 by using the basic control amount Ta and the derivative control amount Tb, computed by the torque-related control, amount computing unit 30, and the damping control amount Tc computed by the rotation angle-related control amount computing unit 40. Hereinafter, the torque-related control amount computing unit 30 will be specifically described first.

The torque-related control amount computing unit 30 includes a torque computing unit 31. the torque computing unit 31 receives the signal corresponding to the steering torque T (torque T) output from the steering torque sensor 22, and constitutes the torque sensor that computes the torque T. When the torque computing unit 31 computes the torque T, the torque computing unit 31 outputs the computed torque T to a torque derivative computing unit 32 and a sampling and holding unit 33 (hereinafter, simply referred to as S/H unit 33). Here, as described above, the steering torque sensor 22 outputs a signal corresponding to the torque T at the detection cycle shorter than or equal to the control operation cycle of the electronic control unit 24 when the detection operation is normal, and outputs a signal corresponding to the torque T at the detection cycle longer than the control operation cycle when there is an abnormality in the detection operation. Thus, of course, the torque T that is output from the torque computing unit 31 to the torque derivative computing unit 32 and the S/H unit 33 is output at the cycle according to the detection cycle when the steering torque sensor 22 is normal or when the steering torque sensor 22 is abnormal.

The torque derivative computing unit 32 receives the torque T supplied from the torque computing unit 31. The torque derivative computing unit 32 temporally differentiates the input torque T, and outputs a time derivative value dT/dt of the torque T (hereinafter, simply referred to as torque derivative value T') to a sampling and holding unit 34. Hereinafter, the sampling and holding unit 34 is also simply referred to as the S/H unit 34.

When the detection operation of the steering torque sensor 22 is normal, the S/H unit 33 directly outputs the torque T, output form the torque computing unit 31, to a basic control amount computing unit 35. On the other hand, when there is an abnormality in the detection operation of the steering torque sensor 22, the S/H unit 33 holds (keeps) the torque T output from the torque computing unit 31, that is, the sampled torque T, in accordance with the detection cycle of the steering torque sensor 22 until the next sampling, and outputs the held torque T to the basic control amount computing unit 35 in accordance with the control operation cycle.

When the detection operation of the steering torque sensor 22 is normal, the S/H unit 34 directly outputs a torque derivative value T', output from the torque derivative computing unit 32, to the derivative control amount computing unit 36. On the other hand, when there is an abnormality in the detection operation of the steering torque sensor 22, the S/H unit 34 holds (keeps) the torque derivative value T' computed by the torque derivative computing unit 32, that is, the sampled torque derivative value T', in accordance with the detection cycle of the steering torque sensor 22 until the next sampling, and outputs the held torque derivative value T' to the derivative control amount computing unit 36 in accordance with the control operation cycle. Hereinafter, sampling and holding of each of the S/H unit 33 and the S/H unit 34 will be, specifically described with reference to FIG. 3.

Figure 3:
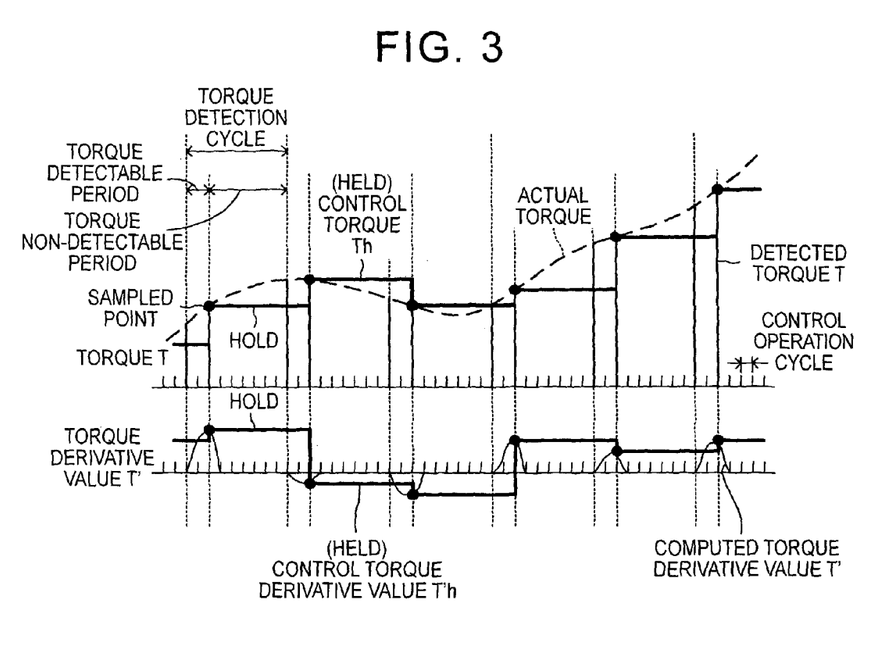
FIG. 3 is a view for illustrating the torque sampling operation and torque holding operation of a sampling and holding unit shown in FIG. 2 according to the embodiment of the invention.

When there occurs an abnormality in the detection operation, the steering torque sensor 22 outputs a signal corresponding to the steering torque T (torque T) at the detection cycle (hereinafter, referred to as torque detection cycle) longer than the control operation cycle of the electronic control unit 24. In this case, as shown in FIG. 3, the torque detection cycle consists of a torque detectable period and a torque non-detectable period. When the torque detectable period is longer than the control operation cycle, the process in which, the torque T is computed by the torque computing unit 31 is executed multiple times (twice in FIG. 3) in each control operation cycle.

When the torque computing unit 31 executes the process of computing the torque T multiple times within the torque detectable period, the torque computing unit 31 outputs the torque T, computed by the last computing process, to the S/H unit 33. Here, in the torque detection cycle, the torque non-detectable period comes after a lapse of the torque detectable period, and output of the torque from the torque computing unit 31 is interrupted. Therefore, as shown in FIG. 3, the S/H unit 33 holds (keeps) the torque T, computed in the last computing process, as a sampled point until the next torque detection cycle (more specifically, the torque, detectable period), and outputs the held torque T to the basic control amount computing unit 35 as a control torque Th in accordance with the control operation cycle. Thus, although discrete for an actual torque indicated by the long dashed line in FIG. 3, it is possible to supply the torque T detected, by the steering torque sensor 22, that is, the control torque Th held at constant in each torque detection cycle, to the basic control amount computing unit 35.

When the torque computing unit 31 executes, the process of computing the torque T multiple times in the torque detectable period, the torque computing unit 31 is able to output the plurality of (two in FIG. 3) torques T, computed as a result of the computing process, to the torque derivative computing unit 32. Thus, as shown in FIG. 3, the torque derivative computing unit 32 computes the torque derivative value T' by temporally differentiating the plurality of torques T supplied from the torque computing unit 31. Here, as described above, in the torque detection cycle, the torque non-detectable period comes after a lapse of the torque detectable period, and output of the torque T from the torque computing unit 31 is interrupted. Therefore, as shown in FIG. 3, when the torque derivative computing unit 32 executes the process of computing the torque derivative value T' multiple times in the torque detectable period, the torque derivative computing unit 32 outputs the torque derivative value T', computed in the last computing process, to the S/H unit 34.

Thus, as shown in FIG. 3, the S/H unit 34 holds (keeps) the torque derivative value T', computed in the last computing process, as a sampled point until the next torque detection cycle (more specifically, the torque detectable period), and outputs the held torque derivative value T' to the derivative control amount computing unit 36 as a control torque derivative value T'h in accordance with the control operation cycle. In the case of the torque derivative value T' as well, although discrete for a temporal variation in actual torque, indicated by the long dashed line in FIG. 3, it is possible to supply the temporal variation in the torque T detected by the steering torque sensor 22, that is, the control torque derivative value T'h held at constant in each torque detection cycle, to the derivative control amount computing unit 36.

Figure 4:
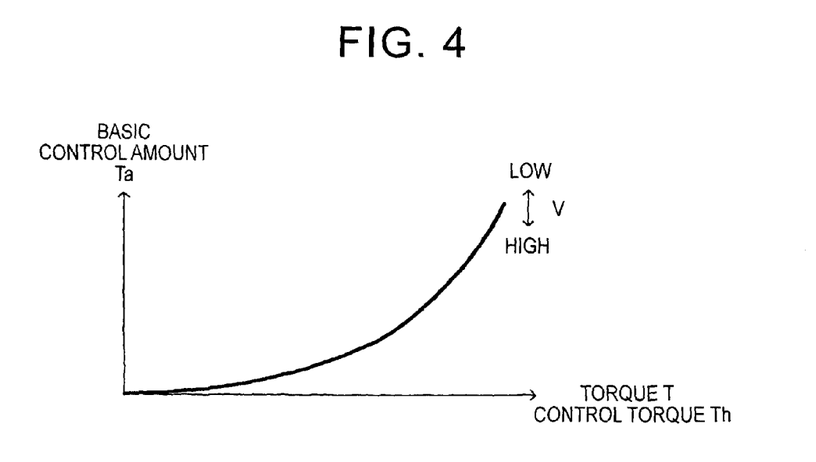
FIG. 4 is a graph that shows a basic control amount map that represents the correlation between a torque (control torque) and a basic control amount, which is consulted by a basic control amount computing unit shown in FIG. 2, according to the embodiment of the invention.

Referring back to FIG. 2, the basic control amount computing unit 35 receives the torque T or the control torque Th from the S/H unit 33 in accordance with whether the detection operation of the steering torque sensor 22 is normal or abnormal, and computes the basic control amount Ta that monotonously increases with an increase in the absolute value of the torque T or control torque Th. Therefore, the basic control amount computing unit 35, for example, computes the basic control amount Ta corresponding to the input torque T or control torque Th by consulting a basic control amount map that monotonously increases like a quadric function as shown in FIG. 4. In the basic control amount map shown in FIG. 4, the third quadrant and the first quadrant are symmetrical with respect to the origin. The basic control amount computing unit 35 outputs the computed basic control amount Ta to an assist amount computing unit 51 of the assist control unit 50. Here, particularly, in the case where there occurs an abnormality in the steering torque sensor 22 and the control torque Th is input from the S/H unit 33, the basic control amount computing unit 35 receives the control torque Th via an input filter for adjusting the phase of a high-frequency region, and computes the basic control amount Ta by using the control torque Th of which the phase is corrected.

The basic control amount map that is consulted by the basic control amount computing unit 35 is set for each representative vehicle speed V. The basic control amount map is set such that the basic control amount Ta relatively reduces with an increase in the vehicle speed V and the basic control amount Ta relatively increases with a decrease in the vehicle speed V. Therefore, as shown in FIG. 2, the basic control amount computing unit 35 receives the vehicle speed V from the vehicle speed sensor 21, and computes the basic control amount Ta corresponding to the input vehicle speed V. Instead of using the basic control amount map, for example, the basic control amount Ta may be computed by using a function that expresses the basic control amount Ta as a function of the torque T or control torque Th and the vehicle speed V.

The derivative control amount computing unit 36 receives the torque derivative value T' or the control torque derivative value Th from the S/H unit 34 in accordance with whether the detection operation of the steering torque sensor 22 is normal or abnormal, and computes the derivative control amount Tb that increases with an increase in the absolute value of the torque derivative value T' or control torque derivative value T'h. Here, the derivative control amount Tb is, for example, a control amount for suppressing vibrations (self-excited vibrations) occurred in the turning operation direction of the steering wheel 11 due to an input disturbance, such as a road noise, while ensuring favorable response. It is possible to quickly converge self-excited vibrations occurred in the turning operation direction of the steering wheel 11 as the derivative control amount Tb increases; whereas it becomes difficult to converge self-excited vibrations occurred in the turning operation direction of the steering wheel 11 as the derivative control amount Tb reduces.

Figure 5:
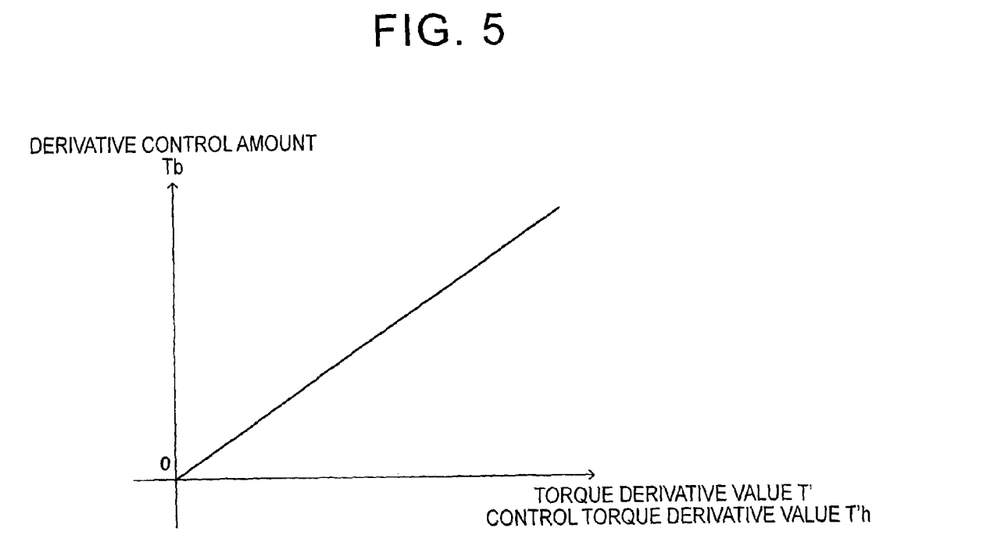
FIG. 5 is a graph that shows a derivative control amount map that represents the correlation between a torque derivative value (control torque derivative value) and a derivative control amount, which is consulted by a derivative control amount computing unit shown in FIG. 2, according to the embodiment of the invention.

Therefore, the derivative control amount computing unit 36, for example, computes the derivative control amount Tb corresponding to the absolute value of the input torque derivative value T' or control torque derivative value T'h by consulting a derivative control amount map that varies like a proportional function as shown in FIG. 5. In the derivative control amount map shown in FIG. 5, the third quadrant and the first quadrant are symmetrical with respect to the origin. The derivative control amount computing unit 36 outputs the computed derivative control amount Tb to the assist amount computing unit 51 of the assist control unit 50. Instead of using the derivative control amount map, for example, the derivative control amount Tb may be computed by using a function that expresses the derivative control amount Tb as a function of the torque derivative value T' or control torque derivative value T'h.

Referring back to FIG. 2, the rotation angle-related control amount computing unit 40 includes a rotation angle computing unit 41. The rotation angle computing unit 41 constitutes the angular velocity sensor that receives a signal corresponding to the rotation angle Θ, output from the motor rotation angle sensor 23, and that computes the rotation angle Θ. When the rotation angle computing unit 41 computes the rotation angle Θ, the rotation angle computing unit 41 outputs the computed rotation angle Θ to an angular velocity computing unit 42.

The angular velocity computing unit 42 receives the rotation angle Θ supplied from the rotation angle computing unit 41. The angular velocity computing unit 42 temporally differentiates the input rotation angle Θ, and outputs the time derivative value $d\Theta/dt$ of the rotation angle Θ to the damping control amount computing unit 43 as an angular velocity Θ'.

Figure 6:
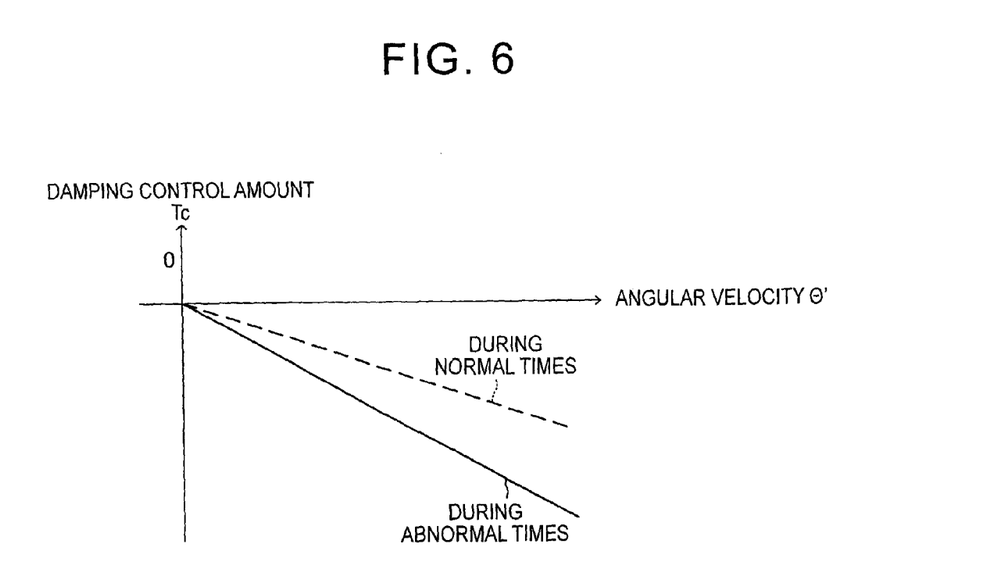
FIG. 6 is a graph that shows a damping control amount map that represents the correlation between an angular velocity and a damping control amount, which is consulted by a damping, control amount computing unit shown in FIG. 2.

The damping control amount computing unit 43 computes a damping control amount Tc that varies with the absolute value of the angular velocity Θ' of the EPS motor 15, supplied from the angular velocity computing unit 42. Therefore, the damping control amount computing unit 43, for example, computes the damping control amount Tc corresponding to the absolute value of the input angular velocity Θ' by consulting a damping control amount map that varies like a proportional function as shown in FIG. 6. In the damping control amount map shown in FIG. 6, the second quadrant and the fourth quadrant are symmetrical with respect to the origin. Here, the damping control amount Tc is a control amount for damping vibrations that occur in the turning operation direction of the steering wheel 11. Therefore, as described above, the damping control amount Tc functions to effectively suppress vibrations of the steering wheel 11, occurred in the turning operation direction, particularly, in a situation that vibrations occurred in the turning operation direction of the steering wheel 11 are hard to converge as the derivative control amount Tb reduces, more specifically, in a situation that the control torque derivative value T'h of which the detection cycle is held so as to be long because of occurrence of an abnormality in the detection operation of the steering torque sensor 22 is supplied in each control operation cycle.

That is, in a situation that the held control torque derivative value T'h is supplied to the derivative control amount computing unit 36 in each control operation cycle, the torque derivative value T' corresponding to actual torque fluctuations is not supplied, so the derivative control amount computing unit 36 may not be able to compute the derivative control amount Tb having an appropriate magnitude. In this case, although it becomes difficult to quickly converge vibrations occurred in the turning operation direction of the steering wheel 11 by using the derivative control amount Tb, it is possible to effectively suppress vibrations in the turning operation direction of the steering wheel 11 by appropriately setting the damping control amount Tc.

Thus, the damping control amount computing unit 43 varies the damping control amount Tc that is computed when the detection operation of the steering torque sensor 22 is normal and the damping control amount Tc that is computed when the detection operation of the steering torque sensor 22 is abnormal from each other. That is, the damping control amount computing unit 43 computes the damping control amount Tc (absolute value) at the time when there is an abnormality in the detection operation of the steering torque sensor 22 as indicated by the solid line in FIG. 6 (in other words, at the time when the control torque derivative value Th is supplied) by increasing the damping control amount Tc (absolute value) as compared to the damping control amount Tc (absolute value) at the time when the detection operation of the steering torque sensor 22 is normal as indicated by the dashed line in FIG. 6 (in other words, at the time when the torque derivative value T' is supplied). Thus, even when there is an abnormality in the detection operation of the steering torque sensor 22 and, for example, the control torque derivative value T'h relatively reduces and, therefore, vibrations easily occur in the turning operation direction of the steering wheel 11 due to a disturbance, it is possible to quickly damp and converge vibrations occurred in the turning operation direction of the steering wheel 11 by computing and setting the increased absolute value of the absolute value of the damping control amount Tc based on the angular velocity $\Theta'$.

The damping control amount computing unit 43 outputs the computed damping control amount Tc to the assist amount computing unit 51 of the assist control unit 50. Instead of using the damping control amount map, for example, the damping control amount Tc may be computed by using a function that expresses the damping control amount Tc as a function of the angular velocity $\Theta'$.

Figure 2:
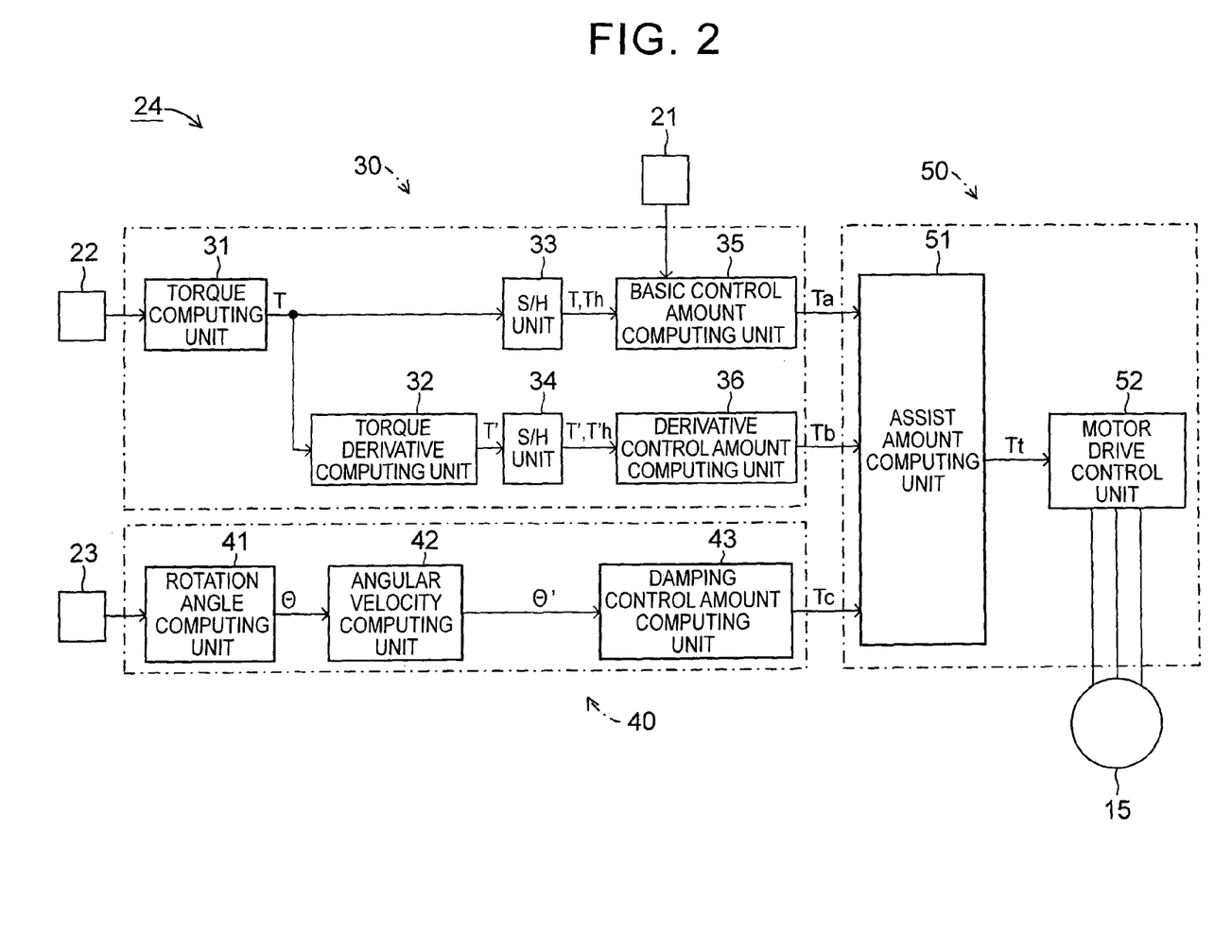
FIG. 2 is a functional block diagram that functionally shows computer program processing (assist control) that is executed by an electronic control unit shown in FIG. 1.

As shown in FIG. 2, in the assist control unit 50, the assist amount computing unit 51 receives the basic control amount Ta supplied from the basic control amount computing unit 35 of the torque-related control amount computing unit 30 and the derivative control amount Tb supplied from the derivative control amount computing unit 36, and receives the damping control amount Tc supplied from the damping control amount computing unit 43 of the rotation angle-related control amount computing unit 40. The assist amount computing unit 51 adds the input basic control amount Ta and derivative control amount Tb together, and computes the assist amount Tt (=Ta+Tb−Tc) as the assist control amount by subtracting the damping control amount Tc from the added value (Ta+Tb). When the assist amount Tt is computed in this way, the assist amount computing unit 51 outputs the computed assist amount Tt to a motor drive control unit 52.

The motor drive control unit 52 receives the assist amount Tt supplied from the assist amount computing unit 51. The motor drive control unit 52 has a predetermined correlation with the magnitude of the input assist amount Tt (corresponding to assist torque), and determines a motor current command value that indicates a current that is supplied to the EPS motor 15. The motor drive control unit 52 supplies the thus determined motor current command value to the drive circuit 25, and the drive circuit 25 supplies driving current corresponding to the supplied motor current command value to the EPS motor 15. Thus, the EPS motor 15 transmits the assist amount Tt that reflects the basic control amount Ta, the derivative control amount Tb and the damping control amount Tc to the rack bar 14. Hence, the driver is able to turn the steering wheel 11 while experiencing a favorable feeling.

As can be understood from the above description, according to the above-described embodiment, when there occurs an abnormality in the detection operation of the steering torque sensor 22, the damping control amount computing unit 43 is able to compute the increased absolute value of the damping control amount Tc that constitutes the assist amount Tt. Thus, for example even when there occur self-excited vibrations in the turning operation direction of the steering wheel 11 due to a disturbance, or the like, input to the steering system, it is possible to quickly damp and converge the occurred self-excited vibrations by using the damping control amount Tc. Thus, even if there occurs an abnormality in the detection operation of the steering torque sensor 22, it is possible to execute assist control close to that during normal times, so it is possible to effectively suppress a feeling of strangeness experienced by the driver.

It is possible to compute the assist amount Tt by increasing the damping control amount Tc, so, for example, even if there occurs an abnormality in the detection operation of the steering torque sensor 22 and the detected torque T or torque derivative value T' is influenced by aliasing as a result of detection, it is possible to suppress unintended self-excited vibrations of the steering wheel 11. Thus, it is possible to effectively prevent occurrence of unintended unpleasant assist in driver's turning operation of the steering wheel 11 due to the influence of aliasing.

Furthermore, when there occurs an abnormality in the detection operation of the steering torque sensor 22, the detection cycle is extended. In this case, the S/H unit 33 and the S/H unit 34 are respectively able to sample the torque T and the torque derivative value T' detected in the last detection cycle and hold them until the next detection cycle. Thus, it is possible to compute the basic control amount Ta and the derivative value control amount Tb by using the held control torque Th and control torque derivative value T'h, and, furthermore, it is possible to add the above-described damping control amount Tc. Therefore, even when there occurs an abnormality in the detection operation of the steering torque sensor 22, it is possible to execute stable assist control.

First Alternative Embodiment

In the above-described embodiment, when there occurs an abnormality in the detection operation of the steering torque sensor 22, the detection cycle of the detection operation extends as compared to that during normal times, and, accordingly, the held control torque Th is supplied from the S/H unit 33 to the basic control amount computing unit 35, and the held control torque derivative value T'h is supplied from the S/H unit 34 to the derivative control amount computing unit 36. In this case, in the above-described embodiment, the basic control amount computing unit 35 is implemented so as to compute the basic control amount Ta by using the basic control amount map shown in FIG. 4 irrespective of whether the steering torque sensor 22 is normal or abnormal, and the derivative control amount computing unit 36 is implemented so as to compute the derivative control amount Tb by using the derivative control amount map shown in FIG. 5 irrespective of whether the steering torque sensor 22 is normal or abnormal. On the other hand, in the above-described embodiment, as shown in FIG. 6, the damping control amount computing unit 43 is implemented so as to compute the damping control amount Tc (absolute value) at the time when there is an abnormality in the detection operation of the steering torque sensor 22 by increasing the damping control amount Tc (absolute value) as compared to the damping control amount Tc (absolute value) at the time when the detention operation of the steering torque sensor 22 is normal.

Figure 7:
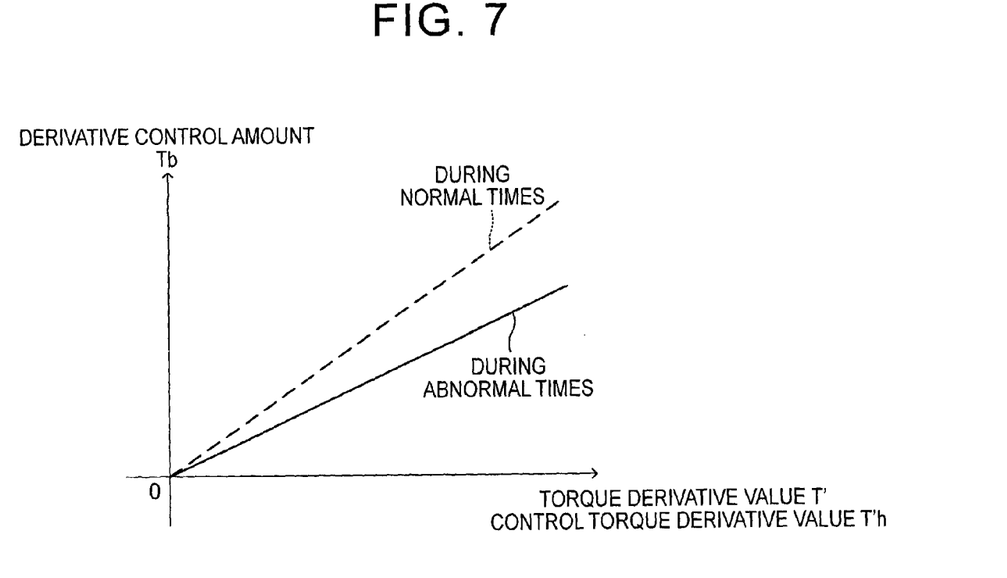
FIG. 7 is a graph that shows a derivative control amount map that represents the correlation between a torque derivative value (control torque derivative value) and a derivative control amount, which is consulted by the derivative control amount computing unit shown in FIG. 2, according to a first alternative embodiment to the embodiment of the invention.

In this case, in order to further appropriately exercise the vibration suppressing effect of the damping control amount Tc computed by the damping control amount computing unit 43, the derivative control amount computing unit 36 may be implemented so as to compute a different derivative control amount Tb (absolute value) in accordance with whether the steering torque sensor 22 is normal or abnormal. That is, the derivative control amount computing unit 36 computes the derivative control amount Tb (absolute value) at the time when there is an abnormality in the detection operation of the steering torque sensor 22 as indicated by the solid line, in FIG. 7 (in other words, at the time when the control torque derivative value T'h is supplied) by reducing the derivative control amount Tb (absolute value) as compared to the derivative control amount Tb (absolute value) at the time when the detection operation of the steering torque sensor 22 is normal as indicated by the dashed line in FIG. 7 (in other words, the torque derivative value T' is supplied).

Thus, it is possible to effectively reduce occurrence of a situation that, for example, a control amount larger than or smaller than the intended derivative control amount Tb is computed in assist control due to the influence of aliasing when there is an abnormality in the detection operation of the steering torque sensor 22. In this case, the derivative control amount Tb reduces and, as a result, vibrations easily occur in the turning operation direction of the steering wheel 11 due to a disturbance. However, as in the case of the above-described embodiment, the damping control amount computing unit 43 computes the increased absolute value of the damping control amount Tc. Thus, it is possible to quickly damp and converge vibrations occurred in the turning operation direction of the steering wheel 11. Thus, as in the case of the above embodiment, it is possible to effectively prevent occurrence of unintended unpleasant assistance in driver's turning operation of the steering wheel 11.

Second Alternative Embodiment

In the above-described embodiment and first alternative embodiment, the basic control amount computing unit 35 is implemented so as to compute the basic control amount Ta by using the basic control amount map shown in FIG. 4 irrespective of whether the steering torque sensor 22 is normal or abnormal. Incidentally, when there occurs an abnormality in the steering torque sensor 22, the held control torque Th is supplied from the S/H unit 33 in each control operation cycle, and the basic control amount computing unit 35 computes the basic control amount Ta by using the control torque Th as described above. Therefore, the basic control amount Ta to be computed may also be influenced by aliasing. The above influence of aliasing is easily experienced by the driver, particularly, in a state where the driver causes the vehicle to travel straight ahead, in other words, in a state where the steering wheel 11 is held near a neutral position without being turned (that is, a state where the steering torque T resulting from turning operation is not input to the steering wheel 11).

Figure 8:
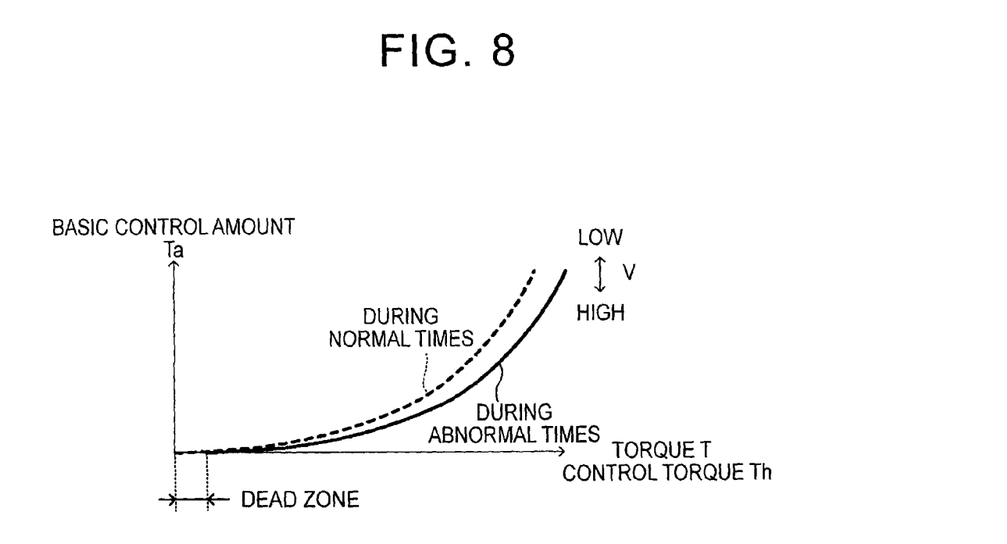
FIG. 8 is a graph that shows a basic control amount map that represents the correlation between a torque (control torque) and a basic control amount having a dead zone during abnormal times, which is consulted by the basic control amount computing unit shown in FIG. 2, according to a second alternative embodiment to the embodiment of the invention.
Figure 9:
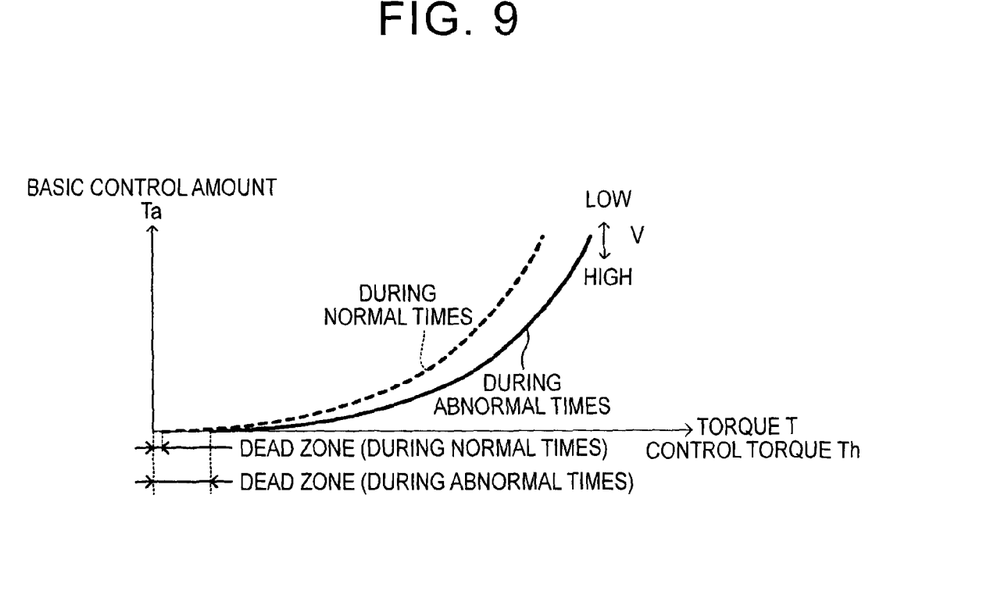
FIG. 9 is a graph that shows a basic control amount map that represents the correlation between a torque (control torque) and a basic control amount having a dead zone during normal times and during abnormal times, which is consulted by the basic control amount computing unit shown in FIG. 2, according to the second alternative embodiment to the embodiment of the invention.

In this case, in the above-described embodiment and first alternative embodiment, instead of the basic control amount map shown in FIG. 4 consulted by the basic control amount computing unit 35, the basic control amount computing unit 35 may be implemented so as to consult a basic control amount map in which a dead zone is set near the neutral position of the steering wheel 11 at least when the steering torque sensor 22 is abnormal as shown in FIG. 8. That is, in the dead zone, the basic control amount computing unit 35 computes the basic control amount Ta as "0" for the control torque Th that is supplied from the S/H unit 33. Specifically, the basic control amount computing unit 35 may consult the basic control amount map in which no dead zone is set as indicated by the dashed line in FIG. 8 when the steering torque sensor 22 is normal, and may consult the basic control amount map in which the dead zone having a predetermined width is set as indicated by the solid line in FIG. 8 when there is an abnormality in the steering torque sensor 22. Alternatively, as shown in FIG. 9, the basic control amount computing unit 35 may consult a basic control amount map (dashed line) in which a narrow dead zone is set when the steering torque sensor 22 is normal, and may consult a basic control amount map (solid line) in which a dead zone wider than that during normal times is set when there is an abnormality in the steering torque sensor 22.

Thus, in the case where there is an abnormality in the detection operation of the steering torque sensor. 22, particularly, when the vehicle is caused to travel straight ahead (in other words, the steering torque T that is input by the driver to turn the steering wheel 11 is "0"), it is possible to effectively prevent fluctuations of the basic control amount Ta due to the influence of the above-described aliasing. As in the case of the above-described embodiment and first alternative embodiment, by computing the increased absolute value of the damping control amount Tc or computing the reduced absolute value of the derivative control amount Tb, it is possible to quickly damp and converge vibrations occurred in the turning operation direction of the steering wheel 11. Thus, in this second alternative embodiment as well, as in the case of the above-described embodiment and first alternative embodiment, it is possible to effectively prevent occurrence of unintended unpleasant assistance in driver's turning operation of the steering wheel 11.

Third Alternative Embodiment

The above-described embodiment and first and second alternative embodiments are implemented without changing the torque T in the basic control amount map or the characteristics of a variation in the basic control amount for a variation in the control torque Th, more specifically, the maximum gradient (that is, gain) of the basic control amount map, irrespective of whether the steering torque sensor 22 is normal or abnormal. In this case, when there occurs an abnormality in the steering torque sensor 22, it is possible to stably execute assist control by setting the basic control amount map such that the maximum gradient of the basic control amount map reduces.

Figure 10:
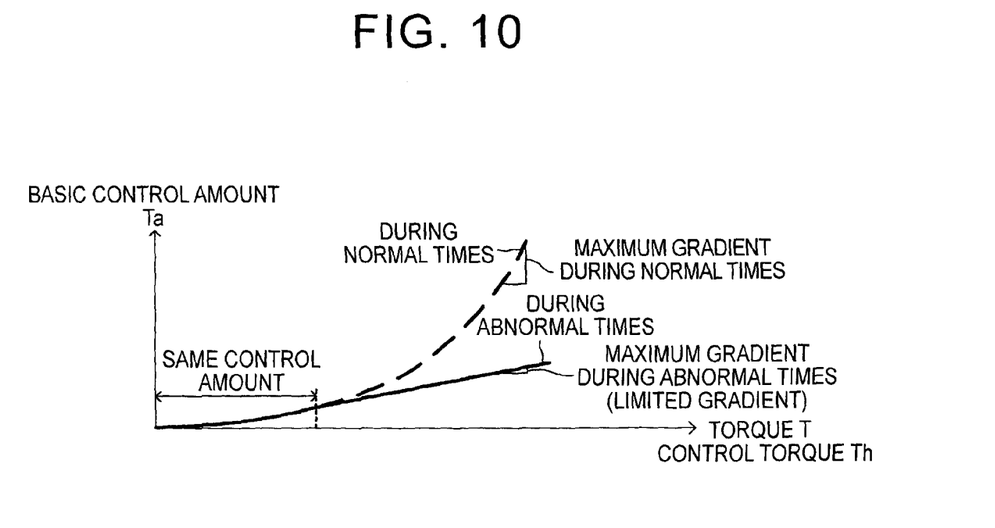
FIG. 10 is a graph that shows a basic control amount map that represents the correlation between a torque (control torque) and a basic control amount of which a maximum gradient during abnormal times is suppressed, which is consulted by the basic control amount computing unit shown in FIG. 2, according to a third alternative embodiment to the embodiment of the invention.

Specifically, instead of the basic control amount map shown in FIG. 4 consulted by the basic control amount computing unit 35 in the above-described embodiment and first and second alternative embodiments, the basic control amount computing unit 35 may be implemented so as to consult the basic control amount map such that the maximum gradient reduces when the steering torque sensor 22 is abnormal. That is, as shown in FIG. 10, the basic control amount computing unit 35 may consult a basic control amount map having the variation characteristics shown in FIG. 4 when the steering torque sensor 22 is normal, and may consult a basic control amount map such that the maximum gradient is reduced as compared to that during normal times when there occurs an abnormality in the steering torque sensor 22. At this time, as shown in FIG. 10, for example, in a region smaller than or equal to a preset limit gradient, a common basic control amount map may be consulted during normal times and during abnormal times.

Thus, even when there is an abnormality in the detection operation of the steering torque sensor 22, it is possible to stably assist driver's turning operation of the steering wheel 11, and it is possible, to suppress occurrence of a feeling of strangeness between during normal times and during abnormal times due to the configuration that the basic control amount map is partially shared. As in the case of the above-described embodiment and first and second alternative embodiments, by computing the increased absolute value of the damping control amount Tc, computing the reduced absolute value of the derivative control amount Tb or setting a dead zone for the basic control amount Ta, it is possible to suppress a feeling of strangeness when the vehicle travels straight ahead and to quickly damp and converge vibrations occurred in the turning operation direction of the steering wheel 11. Thus, in this third alternative embodiment as well, as in the case of the above-described embodiment and first and second alternative embodiments, it is possible to effectively prevent occurrence of unintended unpleasant assistance in driver's turning operation of the steering wheel 11.

Fourth Alternative Embodiment

Figure 11:
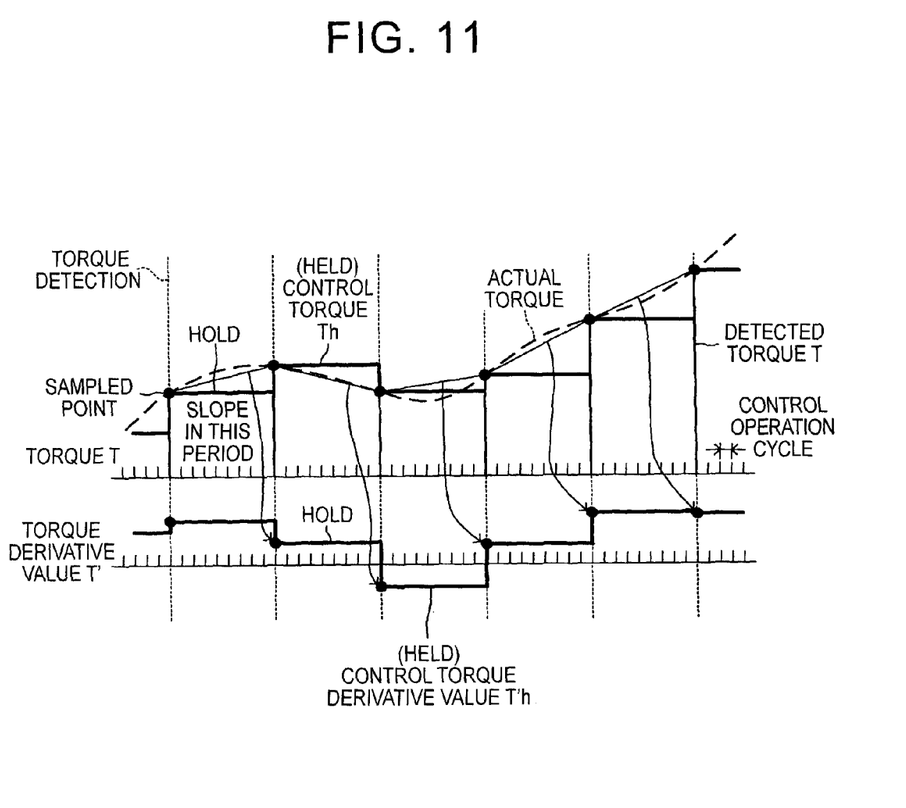
FIG. 11 is a view for illustrating the torque sampling operation and torque holding operation of the sampling and holding unit shown in FIG. 2 according to a fourth alternative embodiment to the embodiment of the invention.

In the above-described embodiment and first to third alternative embodiments, when there occurs an abnormality in the steering torque sensor 22, the embodiments are implemented such that the torque detectable period is longer than the control operation cycle and control operations are executed multiple times within the torque detectable period. In contrast to this, when the torque is detected once in each long detection cycle, the torque computing unit 31 executes the process of computing the torque T once each time the torque is detected and outputs the computed torque T to the S/H unit 33 as shown in FIG. 11. In this case, as shown in FIG. 11, the S/H unit 33 holds (keeps) the computed torque T as a sampled point until the next torque detection, and outputs the held torque T as the torque Th to the basic control amount computing unit 35 in each control operation cycle. Thus, in this case as well, although discrete for an actual torque indicated by the long dashed line in FIG. 11, it is possible to supply the torque T detected by the steering torque sensor 22, that is, the control torque Th held at constant within the torque detection cycle, to the basic control amount computing unit 35 in each control operation cycle.

As shown, in FIG. 11, when control operation is executed once within the torque detectable period (more specifically, torque is detected only once), the torque T computed as a result of the computing process is output to the torque derivative computing unit 32. In this case, as shown in FIG. 11, the torque derivative computing unit 32 executes computing process for setting a slope between the last torque T (more specifically, the last control torque Th) and the current torque T (more specifically, the current control torque Th) as the torque derivative value T', and outputs the computed torque derivative value T' to the S/H unit 34.

Thus, as shown in FIG. 11, the S/H unit 34 holds (keeps) the computed torque derivative value T' as a sampled point until the next torque detection in the next torque detectable period, and outputs the held torque derivative value T' as the control torque derivative value T'h to the derivative control amount computing unit 36 in each control operation cycle. In the case of the torque derivative value T' as well, although discrete for a temporal variation in actual torque, indicated by the long dashed line in FIG. 11, it is possible to supply the temporal variation in the torque T detected by the steering torque sensor 22, that is, the control torque derivative value T'h held at constant within the torque detection cycle, to the derivative control amount computing unit 36 in each control operation cycle.

Thus, in this fourth alternative embodiment as well, advantageous effects equivalent to those of the embodiment and first to third alternative embodiments are obtained.

The invention is not limited to the above-described embodiment and alternative embodiments; various modifications are possible without departing from the scope of the invention.

For example, in the above-described embodiment and alternative embodiments, the rotation angle computing unit 41 is implemented so as to compute the rotation angle Θ by using the electric signal output from the motor rotation angle sensor 23, and the angular velocity computing unit 42 is implemented so as to compute the angular velocity Θ' by using the rotation angle Θ. In this case, instead of using the motor rotation angle sensor 23, various sensors that are mounted on the vehicle and detect physical quantities that vary with turning operation of the steering wheel 11 may be employed. For example, the various sensors include a steering angle sensor that detects a driver's turning operation amount of the steering wheel 11, a steered angle sensor that detects a steered amount of the right and left front wheels FW1, FW2 (a displacement of the rack bar 14), a motor current detection sensor that is provided at the EPS motor 15 and detects a driving current, a motor voltage sensor that detects a motor terminal voltage of the EPS motor 15, and the like. The rotation angle computing unit 41 may compute the rotation angle by using the electric signals that indicate the physical quantities detected by these various sensors, and the angular velocity computing unit 42 may compute the angular velocity by using the rotation angle. The angular velocity computing unit 42 is able to directly compute the angular velocity by using the electric signals that indicate the physical quantities detected by the various sensors. Thus, advantageous effects similar to the above-described embodiment and alternative embodiments are expected.

The invention claimed is:

1. A steering control system for a vehicle, comprising:
an electric motor configured to apply assist force to a turning operation of a steering wheel;
a torque sensor configured to detect a torque that is generated in a steering system including the steering wheel and that varies with the turning operation of the steering wheel;
an angular velocity sensor configured to detect an angular velocity that is generated in the steering system including the steering wheel and that varies with the turning operation of the steering wheel; and
a control unit configured to compute an assist control amount for the turning operation of the steering wheel by using the torque and the angular velocity, and configured to, when there occurs an abnormality in an operation of the torque sensor to detect the torque, increase a first control amount that is computed by using the angular velocity detected by the angular velocity sensor among control amounts that constitute the assist control amount as compared to that when the operation of the torque sensor to detect the torque is normal and execute drive control over the electric motor on the basis of the assist control amount.

2. The steering control system according to claim 1, wherein
the control unit is configured to, when there occurs the abnormality in the operation of the torque sensor to detect the torque, reduce a second control amount that is computed by using a derivative value obtained by temporally differentiating the torque detected by the torque sensor among the control amounts that constitute the assist control amount as compared to that when the operation of the torque sensor to detect the torque is normal.

3. The steering control system according to claim 1, wherein
the control unit is configured to, when there occurs the abnormality in the operation of the torque sensor to detect the torque, set a dead zone in which the assist control amount is computed such that a third control amount that is computed by using the torque detected by the torque sensor among the control amounts that constitute the assist control amount is set to "0" by assuming a magnitude of the torque that is input as a result of the turning operation of the steering wheel as "0".

4. The steering control system according to claim 3, wherein
the control unit is configured to, when there occurs the abnormality in the operation of the torque sensor to detect the torque, expand a range in which the magnitude of the torque that is input as a result of the turning operation of the steering wheel is assumed as "0" in the dead zone.

5. The steering control system according to claim 3, wherein the control unit is configured to, when there occurs the abnormality in the operation of the torque sensor to detect the torque, reduce a maximum gradient of the third control amount that is computed by using the torque for a variation in the torque among the control amounts that constitute the assist control amount as compared to that when the operation of the torque sensor to detect the torque is normal.

6. The steering control system according to claim 1, wherein
the first control amount that is computed by using the angular velocity detected by the angular velocity sensor is a damping control amount for suppressing vibrations occurred in proportion to the angular velocity in a turning operation direction of the steering wheel.

7. The steering control system according to claim 2, wherein
the second control amount that is computed by using the derivative value obtained by temporally differentiating the torque detected by the torque sensor is a derivative control amount that converges vibrations that occur in the steering wheel due to a disturbance that is input from an outside to the steering system in proportion to the derivative value.

8. The steering control system according to claim 3, wherein
the third control amount that is computed by using the torque is a basic control amount that correlates with the torque so as to monotonously increase and that determines an assist characteristic for the turning operation of the steering wheel.

9. The steering control system according to claim 1, wherein the torque sensor is configured to, when there occurs the abnormality in the detection operation of the torque sensor, detect the torque at a detection cycle longer than a control operation cycle at which the control unit computes the assist control amount for executing the drive control over the electric motor.

10. The steering control system according to claim 9, wherein
the control unit is configured to, when there occurs the abnormality in the operation of the torque sensor to detect the torque, compute the assist control amount by keeping the torque, detected by the torque sensor up to a last detection cycle, until the torque sensor detects the torque in a next detection cycle.

11. The steering control system according to claim 10, wherein
the control unit is configured to, when the torque sensor detects the torque multiple times within each detection cycle, compute the assist control amount by keeping the torque detected last time among a plurality of torques detected within the detection cycle until the torque sensor detects the torque in the next detection cycle.

12. The steering control system according to claim 10, wherein
the control unit is further configured to, when there occurs the abnormality in the operation of the torque sensor to detect the torque, compute the assist control amount by keeping a derivative value obtained by temporally differentiating the torque, detected by the torque sensor up to the last detection cycle, until the torque sensor detects the torque in the next detection cycle.

13. A steering control method for a vehicle, comprising:
detecting a torque that is generated as a result of a turning operation of a steering wheel in a steering system of the vehicle, which turns a wheel, with the use of a torque sensor;
detecting an angular velocity that is generated as a result of the turning operation of the steering wheel in the steering system of the vehicle, with the use of an angular velocity sensor;
determining whether there is an abnormality in an operation of the torque sensor to detect the torque;
computing an assist control amount for the turning operation of the steering wheel by using the torque and the angular velocity when there is no abnormality in the operation of the torque sensor to detect the torque;
when there is the abnormality in the operation of the torque sensor to detect the torque, computing increasing a first control amount that is computed by using the angular velocity among control amounts that constitute the assist control amount, as compared to that when there is no abnormality in the operation of the torque sensor to detect the torque; and
controlling an electric motor that applies assist force to the turning operation of the steering wheel on the basis of the assist control amount.

* * * * *